(12) United States Patent
Kawashima et al.

(10) Patent No.: US 7,571,786 B2
(45) Date of Patent: Aug. 11, 2009

(54) WHEELED WORKING MACHINE

(75) Inventors: Ichiro Kawashima, Akashi (JP);
Taisuke Tsunoo, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 378 days.

(21) Appl. No.: 11/319,742

(22) Filed: Dec. 29, 2005

(65) Prior Publication Data

US 2006/0151233 A1 Jul. 13, 2006

(30) Foreign Application Priority Data

Jan. 11, 2005 (JP) ............................. 2005-003287
Oct. 20, 2005 (JP) ............................. 2005-306427

(51) Int. Cl.
*B62D 5/08* (2006.01)
(52) U.S. Cl. ..................................... 180/89.3; 179/414
(58) Field of Classification Search .............. 180/89.13, 180/414, 415
See application file for complete search history.

(56) References Cited

U.S. PATENT DOCUMENTS 3,195,913 A * 7/1965 Hallsworth ................. 280/775
4,016,948 A * 4/1977 Kuester ...................... 180/417
4,140,199 A * 2/1979 Lester ........................ 180/327
5,752,578 A   5/1998 Kellogg
6,161,638 A * 12/2000 Barthalow ................. 180/6.6
7,383,906 B2 * 6/2008 Sewell ...................... 180/89.13
7,419,023 B2 * 9/2008 Mieger ..................... 180/89.13

FOREIGN PATENT DOCUMENTS

DE      2052085       4/1972
JP      5-39057       2/1993

* cited by examiner

*Primary Examiner*—Kevin Hurley
(74) *Attorney, Agent, or Firm*—Oblon, Spivak, McClelland, Maier & Neustadt, P.C.

(57) ABSTRACT

A steering apparatus provided in a wheeled working machine according to the present invention includes mechanical steering means for steering front wheels in accordance with the operation of operating means by connecting the operating means to a link member for changing the direction of the front wheels so as to transmit a steering force, full-hydraulic steering means, having steering cylinders for respectively changing directions of the front and rear wheels, for steering at least one of the front and rear wheels by introducing hydraulic oil to predetermined steering cylinders in accordance with the operation of the operating means and a selected mode, and switching means for switching the means so as to selectively actuate one of the mechanical steering means and the full-hydraulic steering means.

5 Claims, 9 Drawing Sheets

WHEELED WORKING MACHINE

BACKGROUND OF THE INVENTION

1. Field of the Invention

The present invention relates to a wheeled working machine such as a wheeled crane having a steering apparatus.

2. Description of the Related Art

A steering apparatus for a wheeled crane, having an upper rotating body rotatably mounted on a lower traveling body including front wheels and rear wheels, includes several full-hydraulic systems as disclosed in Japanese Unexamined Patent Application Publication No. H5-39057, which includes four steering cylinders for steering the front and rear wheels, respectively, whereby an operator in a cab steers at least one of the front wheels and the rear wheels by introducing hydraulic oil to predetermined steering cylinders in accordance with a selection mode, such as a rotational amount of a steering handle and a switch operation, which are operated by the operator. In this case, the selection mode includes a normal mode for steering only the front wheels, a crab mode for steering the front and rear wheels in the same direction, a clamp mode for steering the front and rear wheels in opposite directions to each other for reducing a turning radius, and a reverse steering mode for driving in the same feeling as that in normal traveling even when traveling in a state that the upper rotating body is rotated at 180° to the lower traveling body.

However, since in this apparatus, the steering handle and the wheels are not mechanically connected together for transmitting a steering force, the traveling speed during traveling on a general public road is limited worldwide; it is limited to 25 km/h or less especially in Europe.

On the other hand, a steering apparatus is known in Europe in that the steering handle and a tie rod for changing the direction of the front wheels are mechanically connected together as a wheeled crane capable of traveling at a high speed of about 80 km/h. This apparatus includes steering cylinders for changing the direction of the rear wheels so that the rear wheels can be steered by the switch operation independently from the rear wheel steering by the handle operation, and the clamp mode and the crab mode can be selected in addition to the normal mode.

However, when traveling in the cramp or crab mode, this apparatus has a disadvantage of the poor operationality because the rear wheel steering must be simultaneously executed by the switching operation independently from the front wheel steering by the handle operation. The apparatus also has a disadvantage that since the steering handle on the upper rotating body and the tie rod of the lower traveling body are mechanically connected together, when the upper rotating body is rotated during crane operation, the steering handle rotates on its own accord, giving the operator unpleasant feeling and a disadvantage of impossible to travel in the reverse steering mode.

SUMMARY OF THE INVENTION

Accordingly, it is an object of the present invention to provide a wheeled operation machine having a steering apparatus capable of two-wheel steering during traveling at high speed with a robust and reliable mechanism and capable of four-wheel steering airily by only the handle operation during traveling at low speed so as to be excellent in operationality and reliability as well as user-friendly.

A wheeled working machine according to the present invention has a fundamental configuration as follows. That is, a wheeled working machine includes a lower traveling body having front wheels and rear wheels; an upper rotating body rotatably mounted on the lower traveling body; a cab arranged on one of the left and right sides of the upper rotating body for serving as an operating room during working as well as a driving room during traveling; and a steering apparatus which includes mechanical steering means for steering the front wheels in accordance with the operation of operating means arranged within the cab by connecting the operating means to a link member for changing the direction of the front wheels so as to transmit a steering force; full-hydraulic steering means, having steering cylinders for respectively changing the directions of the front wheels and the rear wheels, for steering at least one of the front wheels and the rear wheels by introducing hydraulic oil as working oil to predetermined steering cylinders in accordance with the operation of the operating means and a selected mode relating to the steering of the front wheels and the rear wheels; and switching means for switching one of the mechanical steering means and the full-hydraulic steering means so as to be selectively actuated.

According to this configuration, during traveling at high speed, when the machine is switched by the switching means to actuate the mechanical steering means in advance, a steering force of the steering handle as the operating means is transmitted to the front-wheel tie rod via the mechanical steering means so as to bilaterally steer the front wheels in accordance with the handle operation. At this time, the front wheels are connected to the steering handle as the operating means via the mechanical steering means, so that the steering of the front wheels can be reinforced. In this respect, the present invention is effective especially when the machines are exported to Europe (when the invention is brought into operation in Europe).

The operating means may be described below by exemplifying the steering handle.

On the other hand, during traveling at low speed, when the machine is switched by the switching means to actuate the full-hydraulic steering means in advance, hydraulic oil is introduced to predetermined steering cylinders by the full-hydraulic steering means in accordance with the operation of the operating means and-the selected mode so as to steer at least one-of the front wheels and the rear wheels.

At this time, the selected mode may include the normal mode, the clamp mode, the crab mode, and the reverse steering mode in the same way as in the full-hydraulic steering apparatus as described in "THE RELATED ART". Moreover, even when any mode is selected, since it is sufficient to operate only the operating means (rotate only the steering handle), the operation is facilitated.

Also, during working, in the same way as during the low speed traveling, when the apparatus is switched by the switching means so as to actuate the full-hydraulic steering means in advance, by the mechanical steering means, the steering force transmission is blocked between the steering handle adjacent to the upper rotating body and the front-wheel tie rod adjacent to the lower traveling body. Hence, even when the upper rotating body is rotated along with the working, the handle cannot be rotated so as to not give uncomfortable feeling to an operator, improving the reliability.

Furthermore, the switching means is composed of a gear box provided at the base end of a steering shaft connected to the steering handle. The gear box may preferably include an input shaft, through which a steering force is transmitted from the steering shaft, a first output shaft outputting a steering force to the mechanical steering means, a-second output shaft outputting a steering force to the full-hydraulic steering means, and a clutch for switching the transmission of the steering force from the input shaft between the first and second output shafts. In this case, by the switching of the clutch of the gear box, a steering force from the steering shaft and by extension from the steering handle can be transmitted to any one of the mechanical steering means and the full-hydraulic steering means so as to actuate its function, further securing the switching operation.

Furthermore, preferably, the mechanical steering means is constructed to assist the steering of the front wheels by introducing hydraulic oil to the steering cylinders for the front wheels of the full-hydraulic steering means in accordance with the rotational operation of the steering handle. In this case, when the mechanical steering means is selected and a steering force of the steering handle is transmitted to the tie rod-as the link member for the front wheels via the mechanical steering means so as to steer the front wheels, hydraulic oil is introduced to the steering cylinders for the front wheels of the full-hydraulic steering means so as to assist the steering of the front wheels. Hence, the front wheels can be airily steered so as to improve the operationality. Moreover, the power steering device also serves as the-steering cylinders of the full-hydraulic steering means so as to reduce the number of components and the cost.

The specific structure of the mechanical steering means may include the following two configurations. That is, the mechanical steering means includes a supply line for introducing hydraulic oil to the steering cylinders for the front wheels from a hydraulic source, a control valve arranged on the supply line for changing a communication state of the supply line in accordance with the rotational operation of the steering handle, and a double pilot check valve provided on the downstream side of the control valve for preventing pressurized oil from being returned to a tank circuit of the mechanical steering means when the full-hydraulic steering means is selected.

Alternatively, the mechanical steering means includes a supply line for introducing hydraulic oil to the steering cylinders for the front wheels from a hydraulic source, a control valve arranged on the supply line for changing a communication state of the supply line in accordance with the rotational operation of the steering handle, and a directional control valve provided on the downstream side of the control valve for communicating the supply line when the mechanical steering means is selected and for blocking: the supply line when the full-hydraulic steering means is selected. In this case, when the front wheels are steered during selecting the mechanical steering means (i.e., during traveling at high speed), the straight returning force applied to the front wheels is transmitted to the steering handle without being retained by the steering cylinders for the front wheels due to the blocking function of the double pilot check valve as described specifically. Hence, the steering force during returning the steering handle to the neutral position can be reduced.

Furthermore, two preferred configurations of the mechanical steering means are as follows. Those are, the mechanical steering means shares a hydraulic pump of the full-hydraulic steering means as a hydraulic source and includes a directional control valve for selectively communicating the pressurized oil of the hydraulic pump with an oil pressure circuit of the full-hydraulic steering means or the supply line. In this case, by the switching of the directional control valve, the hydraulic pump of the full-hydraulic steering means may be used as the hydraulic source of the mechanical steering means, so that the hydraulic circuit can be simplified by the sharing of the hydraulic pump.

DESCRIPTION OF THE PREFERRED EMBODIMENTS

Most preferred embodiments according to the present invention will be described below with reference to the; drawings.

Figure 1:
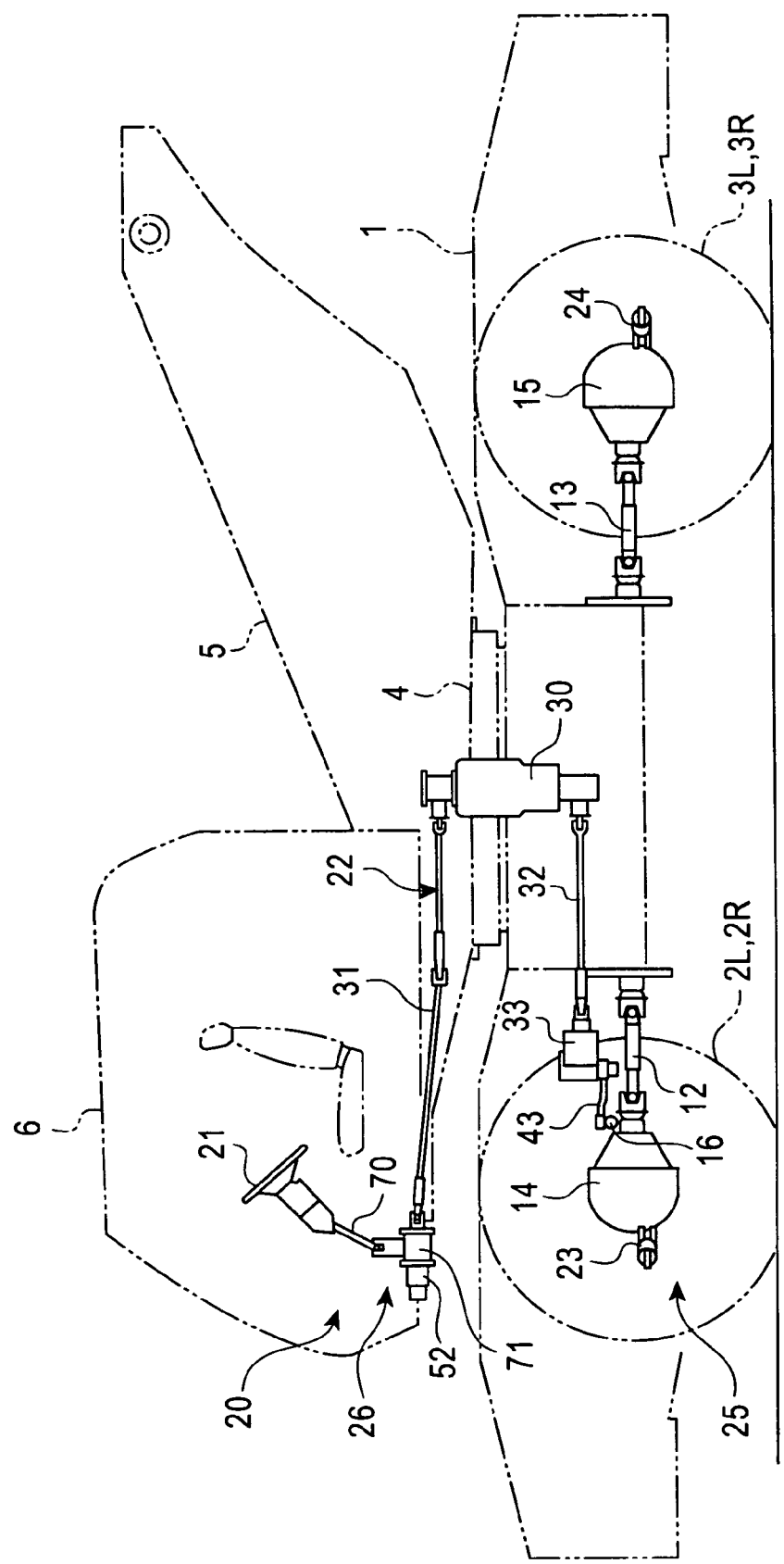
FIG. 1 is a schematic side view of a steering apparatus of a wheeled crane according to a first embodiment of the present invention.
Figure 2:
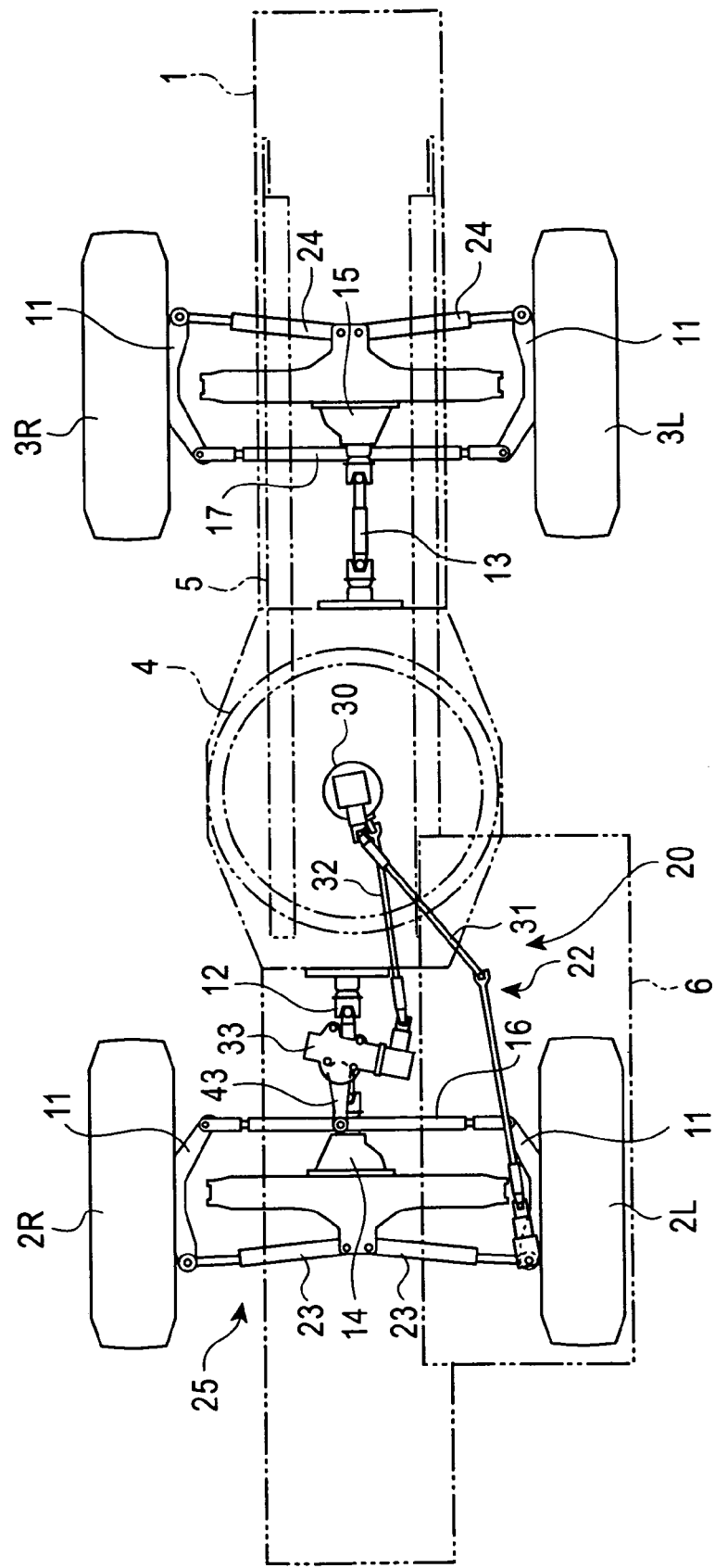
FIG. 2 is a plan view of FIG. 1.

FIGS. 1 and 2 are drawings of a schematic structure of a wheeled crane having a steering apparatus according to a first embodiment of the present invention. A lower traveling body 1 includes front bilateral wheels 2L and 2R and rear bilateral wheels 3L and 3R. On the lower traveling body 1, an upper rotating body 5 is rotatably mounted with a rotating bearing 4 therebetween. At the center of the upper rotating body 5, a telescopic boom (not shown) is derrickably attached. On the left of the upper rotating body 5, a cab 6 is arranged for serving as an operation room during crane operation as well as a driver's room during traveling.

The front wheels 2L and 2R and the rear wheels 3L and 3R are supported to the lower traveling body 1 with knuckle arms 11 and suspension systems (not shown) therebetween, and are driven by the power of an engine (not shown) mounted on the lower traveling body 1 via propeller shafts 12 and 13 and differential gears 14 and 15, respectively. The knuckle arms 11 and 11 of the front wheels 2L and 2R, and the knuckle arms 11 and 11 of the rear wheels 3L and 3R are connected among themselves with tie rods 16 and 17 therebetween as link members extending in the wheel width direction of the crane, respectively, and they are integrally directed in the same direction, respectively, i.e., being able to steer. The front wheels 2L and 2R and the rear wheels 3L and 3R are steered with a steering apparatus 20.

The steering apparatus 20 includes mechanical steering means 22, full-hydraulic steering means 25, and switching means 26 for switching from any one of the mechanical steering means 22 and the full-hydraulic steering means 25 to the other so as to selectively function. The mechanical steering means 20 connects a steering handle 21 arranged in the cab 6 to the tie rod 16 of the front wheels 2L and 2R so as to transmit a steering force thereto, so that the front wheels 2L and 2R are steered in accordance with the rotational operation of the steering handle 21. Then, the full-hydraulic steering means 25 includes steering cylinders 23, 23, 24, and 24 for directing the front wheels 2L and 2R and the rear wheels 3L and 3R, respectively, two cylinders for the front wheels, two for the rear wheels, four in total, so as to steer at least one of the front wheels and the rear wheels by introducing hydraulic oil to predetermined steering cylinders in accordance with the rotational operation of the steering handle 21 and the selected mode.

The mechanical steering means 22 includes a rotating body side transmission shaft train 31 for transmitting a rotational operation force of the steering handle 21 in the cab 6, i.e., a steering force, to an upper part of a swivel joint 30 arranged about the central axis of the rotating bearing 4, a traveling-body side transmission shaft 32 for transmitting a steering force from a lower part of the swivel joint 30 to adjacent to the front wheels 2L and 2R, i.e., to the front, and a semi-integral type power steering device 33 arranged at an end of the traveling-body side transmission shaft 32.

Figure 3:
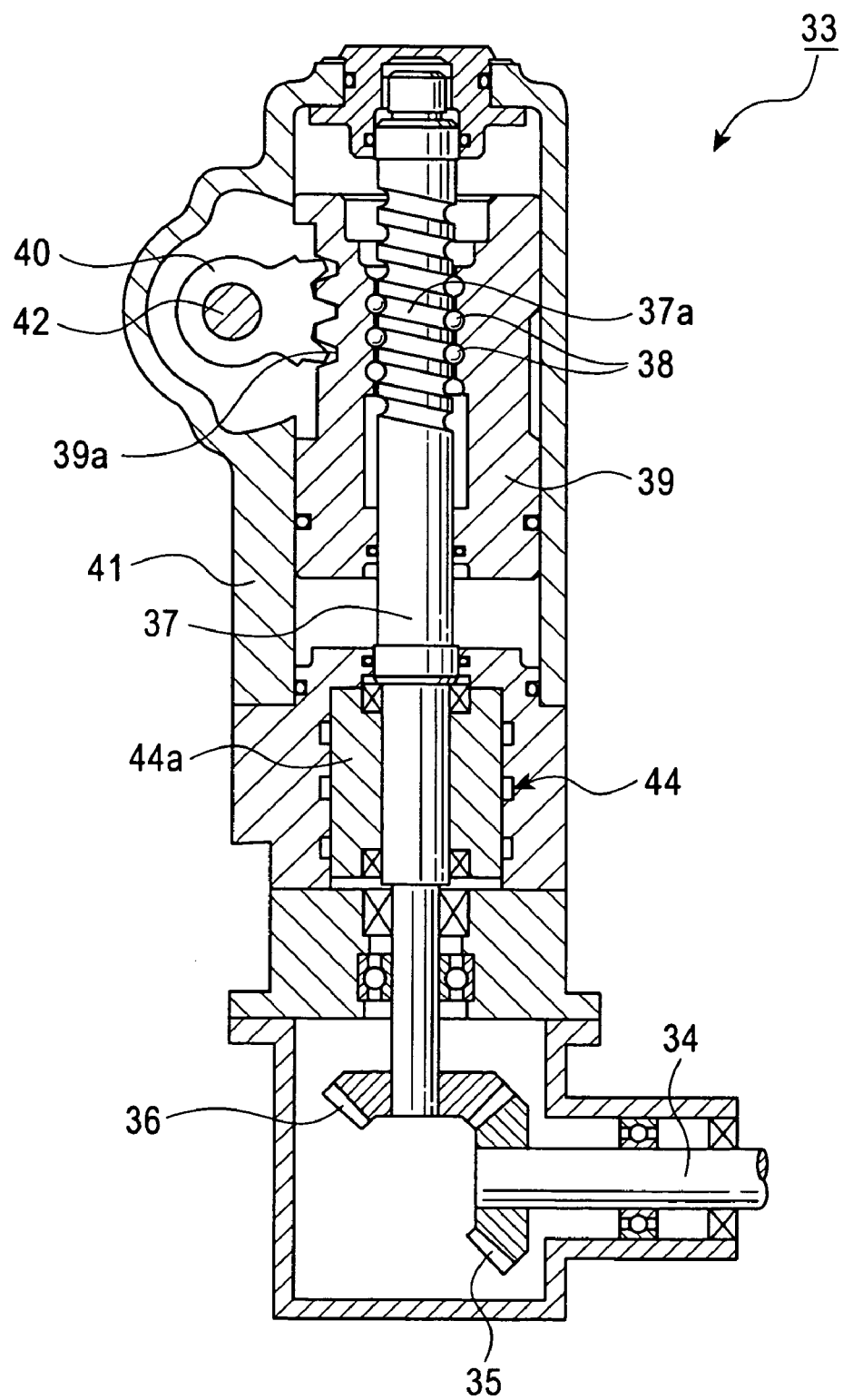
FIG. 3 is a sectional view of a power steering device constituting mechanical steering means of the steering apparatus.

The power steering device 33, as shown in FIG. 3, includes an input shaft 34 connected to the traveling-body side transmission shaft 32, a main shaft 37 connected to the input shaft 34 with a pair of bevel gears 35 and 36 therebetween so as to transmit the driving power, a sliding body 39 mated with a screw portion 37a formed on the main shaft 37 via a number of rigid balls 38, 38, . . . , and a sector gear 40 mated with a rack 39a formed on the external periphery of the sliding body 39, which are housed within a hosing 41. The gear 40 is integrally connected to a support shaft 42 with one end extending outside the housing 41. To the extended end portion of the support shaft 42, as shown in FIGS. 1 and 2, the base end of a lever 43 is integrally connected, which is in turn connected at its other end to the tie rod 16 for the front wheels. Thus, when a steering force is transmitted to the input shaft 34 from the steering handle 21, the main shaft 37 is rotated so as to slide the sliding body 39 along the main shaft 37, so that the gear 40 is rotated about the support shaft 42 integrally with the support shaft 42. The front wheels 2L and 2R are thereby steered via the lever 43 and the tie rod 16. Also, the power steering device 33 is provided with a directional control valve 44 arranged at the center of the main shaft 37 (at a portion of the main shaft 37 between the end adjacent to the bevel gear 36 and the screw portion 37a in detail). A spool 44a of the directional control valve 44 is integrally connected to the main shaft 37. When a steering force of the steering handle 21 is transmitted to the front wheels 2L and 2R via the mechanical steering means 22 so as to steer the front wheels 2L and 2R, as will be described later, by the directional control valve 44 of the power steering device 33, hydraulic oil is introduced to the steering cylinders 23 for the front wheels of the full-hydraulic steering means 25 so as to assist the steering of the front wheels 2L and 2R.

Figure 4:
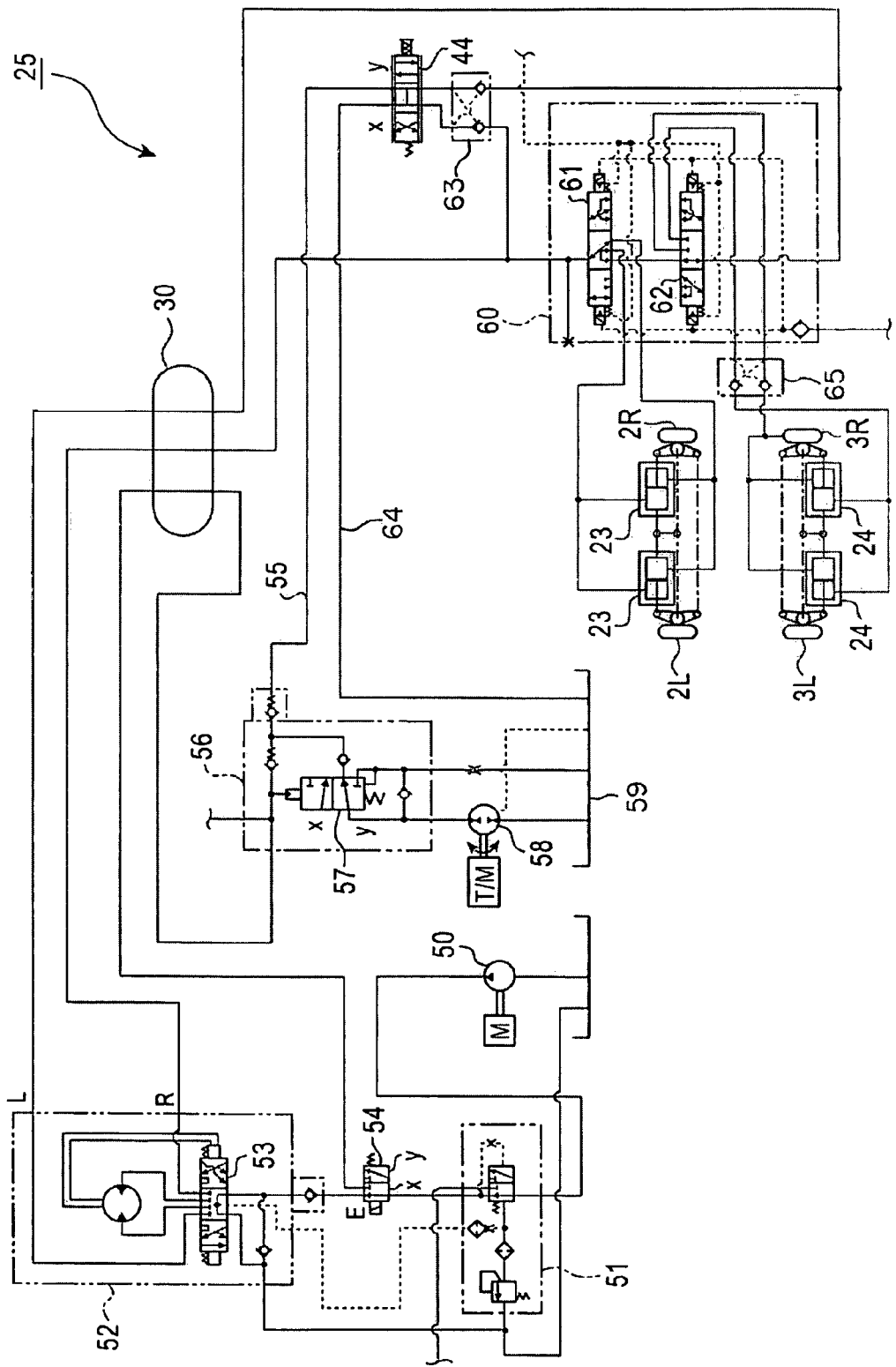
FIG. 4 is a hydraulic circuit diagram of full-hydraulic steering means of the steering apparatus.

FIG. 4 is a hydraulic oil circuit diagram of the full-hydraulic steering means 25. Referring to FIG. 4, a hydraulic pump 50 is mounted on the upper rotating body 5; a priority valve 51 preferentially adjusts the oil amount necessary for the steering in the pressurized oil from the hydraulic pump 50; and to Orbitrol™ 52 as a hydraulic steering control valve, pressurized oil is introduced through the priority valve 51. The Orbitrol 52 supplies an amount of pressurized oil proportional to the rotational direction and the rotational angle of the steering handle 21 to the steering cylinders 23 and 24 through the swivel joint 30 using a control valve connected to the steering handle 21 via the switching means 26.

Also, an electromagnetic directional control valve 54 is provided on a supply pipe between the priority valve 51 and the Orbitrol 52. The directional control valve 54 is operatively associated with the selection by the switching means 26 for switching the position. When the full-hydraulic steering means 25 is selected, the directional control valve 54 is positioned at x position as shown in the drawing by the excitation of an electromagnetic part E so as to introduce pressurized oil from the hydraulic pump 50 supplied through the priority valve 51 to the Orbitrol 52. On the other hand, when the mechanical steering means 22 is selected, the directional control valve 54 is switched to position y by the demagnetization of the electromagnetic part E so as to supply the pressurized oil from the hydraulic pump 50 to the steering cylinders 23 and 24 through a supply path as a supply line 55 without introducing the oil to the Orbitrol 52.

On the downstream side of the swivel joint 30 along the supply line 55 (i.e., adjacent to the lower traveling body 1), an emergency valve unit 56 and a control valve 44 of the power steering device 33 are provided. The emergency valve unit 56 includes a directional control valve 57 using the pressurized oil in the supply line, 55 as a pilot pressure. To the directional control valve 57, an emergency pump motor 58 is connected. When the electromagnetic directional control valve 54 is switched to y position (i.e., the mechanical steering means 22 is selected), if the hydraulic pump 50 is normally operated, the directional control valve 57 is positioned at x position so as to return the pressurized oil to a tank from the emergency pump motor 58. On the other hand, if the hydraulic pump 50 is stopped due to an engine trouble so that the pressurized oil from the hydraulic pump 50 is not supplied to the supply line 55, the directional control valve 57 is switched to y position so that the pressurized oil from the emergency pump motor 58 is supplied to the downstream of the supply line 55. The control valve 44 of the power steering device 33 is composed of a four-port and three-position directional control valve, and during emergency rotational operation of the steering handle 21, the directional control valve 44 is positioned at a neutral position as shown in the drawing, so that during leftward rotational operation of the steering handle 21, it is switched to x position and during rightward rotational operation, it is switched to y position.

Figure 5:
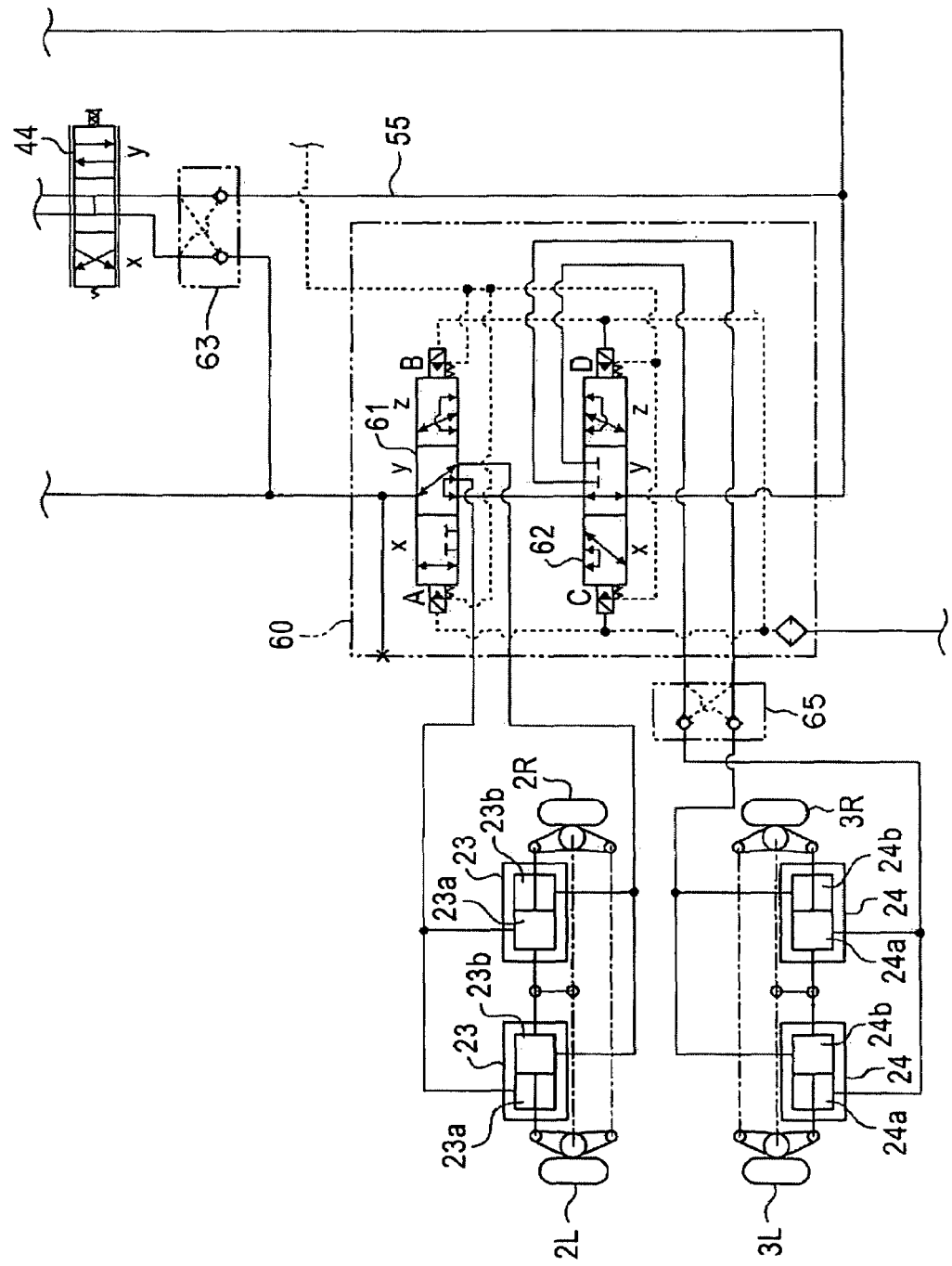
FIG. 5 is an enlarged view of the vicinity of steering cylinders in FIG. 4.

Furthermore, a steering valve unit 60 is provided between the Orbitrol 52 and the steering cylinders 23 and 24. The steering valve unit 60, as shown in FIG. 5 in enlarged detail, includes a steering valve 61 for the front wheels connected to the two bilateral steering cylinders 23 and 23 for the front wheels and a steering valve 62 for the rear wheels connected to the two bilateral steering cylinders 24 and 24 for the rear wheels. Any of the steering valves 61 and 62 is switched to three-positions x, y, and z in accordance with electrification situations (output situations) to the two electromagnetic parts A and B or C and D. A double pilot check valve 63 is provided on the downstream side of the directional control valve 44 along the supply line 55. The double pilot check valve 63 is for preventing the pressurized oil from being returned to an oil tank 59 through a tank pipe path 64 when the full-hydraulic steering means 25 is selected. A double pilot check valve 65 is provided so as to correspond to the steering cylinders 24 and 24 for the rear wheels. The double pilot check valve 65 is for hydraulically holding the rear wheels 3L and 3R at a straight-flight position when the mechanical steering means 22, in which only the front wheels 2L and 2R are steered, is selected.

The relationship between outputs of the electromagnetic parts A to D of the steering valves 61 and 62/the electromagnetic part E of the directional control valve 54 and steering modes are shown in following Table 1.

TABLE 1

| steering mode | | | | | SOL output | | | | |
|---|---|---|---|---|---|---|---|---|---|
| reverse steering | normal | crab | clamp | rear | A | B | C | D | E |
| | O | | | | | | | | |
| | | O | | | | | | O | O |
| | | | O | | | | O | | |
| O | O | | | | | O | | O | O |
| O | | O | | | | O | | O | O |
| O | | | O | | | | O | O | O |
| O | | | | O | O | | O | | O |

That is, (1) during the normal mode, the five electromagnetic parts A to E are entirely non-output, so that the directional control valve 54 is positioned at position y and the steering valves 61 and 62 are positioned at position y together. Hence, the pressurized oil from the hydraulic pump 50 is supplied to the directional control valve 44 of the power steering device 33 via the supply line 55 without being introduced to the Orbitrol 52. When the steering handle 21 is leftward rotated so as to switch the directional control valve 44 to position x at this time, the pressurized oil from the hydraulic pump 50 is introduced to operation chambers 23b of the steering cylinders 23 for the front wheels via the steering valve 61 for the front wheels as hydraulic oil. The bilateral front wheels 2L and 2R are thereby steered together in the left direction by receiving assist forces from the steering cylinders 23 for the front wheels. When the steering handle 21 is rightward rotated so as to switch the directional control valve 44 to position y, the pressurized oil from the hydraulic pump 50 is introduced to the operation chambers 23b of the steering cylinders 23 for the front wheels after sequentially passing through the steering valve 62 for the rear wheels and the steering valve 61 for the front wheels. The bilateral front wheels 2L and 2R are thereby steered together in the right direction by receiving assist forces from the steering cylinders 23 for the front wheels.

(2) During the crab mode, only the electromagnetic part D and the electromagnetic part E of the directional control valve 54 are output, so that the directional control valve 54 is positioned at position x, the steering valve 61 for the front wheels at position y, and the steering valve 62 for the rear wheels at position z. Hence, the pressurized oil from the hydraulic pump 50 is introduced to the Orbitrol 52, so that the pressurized oil is adjusted to have an amount proportional to the rotational direction and the rotational angle of the steering handle 21. When the steering handle 21 is rightward rotated, a predetermined amount of the pressurized oil from an R-port of the Orbitrol 52 is introduced to the operation chambers 23b of the steering cylinders 23 for the front wheels via the steering valves 61 and 62 as hydraulic oil. The bilateral front wheels 2L and 2R are thereby steered in the left direction. Simultaneously, the pressurized oil discharged from the operation chambers 23b of the steering cylinders 23 for the front wheels is introduced to operation chambers 24b of the steering cylinders 24 for the rear wheels after sequentially passing through the steering valve 61 for the front wheels and the steering valve 62 for the rear wheels. The bilateral rear wheels 3L and 3R are thereby steered in the same left direction as that of the front wheels 2L and 2R. On the other hand, when the steering handle 21 is rightward rotated, a predetermined amount of the pressurized oil from an L-port of the Orbitrol 52 is introduced to the operation chambers 24b of the steering cylinders 24 for the rear wheels via the steering valve 62 for the rear wheels as hydraulic oil. The bilateral rear wheels 3L and 3R are thereby steered in the right direction. Simultaneously, the pressurized oil discharged from the operation chambers 24a of the steering cylinders 24 for the rear wheels is introduced to the operation chambers 23b of the steering cylinders 23 for the front wheels after sequentially passing through the steering valve 62 for the rear wheels and the steering valve 61 for the front wheels as hydraulic oil, so that the bilateral front wheels 2L and 2R are thereby steered in the same right direction as that of the rear wheels 3L and 3R.

(3) During the clamp mode, only the electromagnetic part C of the steering valve 62 for the rear wheels is output, so that the directional control valve 54 is positioned at position x; the steering valve 61 for the front wheels at position y; and the steering valve 62 for the rear wheels at position x. Hence, the pressurized oil from the hydraulic pump 50 is introduced to the Orbitrol 52 in the same way as in the crab mode, so that the pressurized oil is adjusted to have an amount proportional to the rotational direction and the rotational angle of the steering handle 21. When the steering handle 21 is leftward rotated, a predetermined amount of the pressurized oil from the R-port of the Orbitrol 52 is introduced to the operation chambers 23b of the steering cylinders 23 for the front wheels via the steering valve 61 for the front wheel as hydraulic oil. The bilateral front wheels 2L and 2R are thereby steered in the left direction. Simultaneously, the pressurized oil discharged from the operation chambers 23a of the steering cylinders 23 for the front wheels is introduced to operation chambers 24b of the steering cylinders 24 for the rear wheels after sequentially passing through the steering valve 61 for the front wheels and the steering valve 62 for the rear wheels. The bilateral rear wheels 3L and 3R are thereby steered in the right direction. On the other hand, when the steering handle 21 is rightward rotated, a predetermined amount of the pressurized oil from the L-port of the Orbitrol 52 is introduced to the operation chambers 24a of the steering cylinders 24 for the rear wheels via the steering valve 62 for the rear wheels as hydraulic oil. The bilateral rear wheels 3L and 3R are thereby steered in the left direction. Simultaneously, the pressurized oil discharged from the operation chambers 24b of the steering cylinders 24 for the rear wheels is introduced to operation chambers 23a of the steering cylinders 23 for the front wheels after sequentially passing through the steering valve 62 for the rear wheels and the steering valve 61 for the front wheels. The bilateral front wheels 2L and 2R are thereby steered in the right direction opposite to that of the rear wheels 3L and 3R.

(4) During the rear mode, the electromagnetic part A of the steering valve 61 for the front wheels, the electromagnetic part C of the steering valve 62 for the rear wheels, and the electromagnetic part E of the directional control valve 54 are output, so that the directional control valve 54 is positioned at position x; the steering valve 61 for the front wheels at position x; and the steering valve 62 for the rear wheels at position x. Hence, the pressurized oil from the hydraulic pump 50 is introduced to the Orbitrol 52, and the pressurized oil is adjusted to have an amount proportional to the rotational direction and the rotational angle of the steering handle 21. When the steering handle 21 is leftward rotated, a predetermined amount of the pressurized oil from the R-port of the Orbitrol 52 is introduced to the operation chambers 24b of the steering cylinders 24 for the rear wheels as hydraulic oil after sequentially passing through the steering valve 61 for the front wheels and the steering valve 62 for the rear wheels. The bilateral rear wheels 3L and 3R are thereby steered in the right direction. On the other hand, when the steering handle 21 is rightward rotated, a predetermined amount of the pressurized oil from the L-port of the Orbitrol 52 is introduced to the operation chambers 24a of the steering cylinders 24 for the rear wheels via the steering valve 62 for the rear wheels as hydraulic oil. The bilateral rear wheels 3L and 3R are thereby steered in the left direction.

(5) During the normal mode of the reverse steering, the electromagnetic part A of the steering valve 61 for the front wheels, the electromagnetic part D of the steering valve 62 for the rear wheels, and the electromagnetic part E of the directional control valve 54 are output, so that the directional control valve 54 is positioned at position x; the steering valve 61 for the front wheels at position x; and the steering valve 62 for the rear wheels at position z. Hence, the pressurized oil from the hydraulic pump 50 is introduced to the Orbitrol 52, and the pressurized oil is adjusted to have an amount proportional to the rotational direction and the rotational angle of the steering handle 21. When the steering handle 21 is leftward rotated, a predetermined amount of the pressurized oil from the R-port of the Orbitrol 52 is introduced to the operation chambers 24a of the steering cylinders 24 for the rear wheels as hydraulic oil after sequentially passing through the steering valve 61 for the front wheels and the steering valve 62 for the rear wheels. The bilateral rear wheels 3L and 3R are thereby steered in the left direction. On the other hand, when the steering handle 21 is rightward rotated, a predetermined amount of the pressurized oil from the L-port of the Orbitrol 52 is introduced to the operation chambers 24b of the steering cylinders 24 for the rear wheels via the steering valve 62 for the rear wheels as hydraulic oil. The bilateral rear wheels 3L and 3R are thereby steered in the right direction.

(6) During the crab mode of the reverse steering, only the electromagnetic part D of the steering valve 62 for the rear wheels and the electromagnetic part E of the directional control valve 54 are output, so that the directional control valve 54 is positioned at position x; the steering valve 61 for the front wheels at position y; and the steering valve 62 for the rear wheels at position z. Hence, the pressurized oil from the hydraulic pump 50 is introduced to the Orbitrol 52, and the pressurized oil is adjusted to have an amount proportional to the rotational direction and the rotational angle of the steering handle 21. When the steering handle 21 is leftward rotated, a predetermined amount of the pressurized oil from the R-port of the Orbitrol 52 is introduced to the operation chambers 23b of the steering cylinders 23 for the front wheels via the steering valve 61 for the front wheels as hydraulic oil. The bilateral front wheels 2L and 2R are thereby steered in the left direction. Simultaneously, the pressurized oil discharged from the operation chambers 23a of the steering cylinders 23 for the front wheels is introduced to operation chambers 24a of the steering cylinders 24 for the rear wheels as hydraulic oil after sequentially passing through the steering valve 61 for the front wheels and the steering valve 62 for the rear wheels. The bilateral rear wheels 3L and 3R are thereby steered in the same left direction as that of the front wheels 2L and 2R. On the other hand, when the steering handle 21 is rightward rotated, a predetermined amount of the pressurized oil from the L-port of the Orbitrol 52 is introduced to the operation chambers 24b of the steering cylinders 24 for the rear wheels via the steering valve 62 for the rear wheels as hydraulic oil. The bilateral rear wheels 3L and 3R are thereby steered in the right direction. Simultaneously, the pressurized oil discharged from the operation chambers 24a of the steering cylinders 24 for the rear wheels is introduced to operation chambers 23a of the steering cylinders 23 for the front wheels as hydraulic oil after sequentially passing through the steering valve 62 for the rear wheels and the steering valve 61 for the front wheels. The bilateral front wheels 2L and 2R are thereby steered in the same right direction as that of the rear wheels 3L and 3R.

(7) During the clamp mode of the reverse steering, the electromagnetic part B of the steering valve 61 for the front wheels, the electromagnetic part D of the steering valve 62 for the rear wheels, and the electromagnetic part E of the directional control valve 54 are output, so that the directional control valve 54 is positioned at position x; the steering valve 61 for the front wheels at position z; and the steering valve 62 for the rear wheels at position z. Hence, the pressurized oil from the hydraulic pump 50 is introduced to the Orbitrol 52, and the pressurized oil is adjusted to have an amount proportional to the rotational direction and the rotational angle of the steering handle 21. When the steering handle 21 is leftward rotated, a predetermined amount of the pressurized oil from the R-port of the Orbitrol 52 is introduced to the operation chambers 23a of the steering cylinders 23 for the front wheels via the steering valve 61 for the front wheels as hydraulic oil. The bilateral front wheels 2L and 2R are thereby steered together in the right direction. Simultaneously, the pressurized oil discharged from the operation chambers 23b of the steering cylinders 23 for the front wheels is introduced to operation chambers 24a of the steering cylinders 24 for the rear wheels as hydraulic oil after sequentially passing through the steering valve 61 for the front wheels and the steering valve 62 for the rear wheels. The bilateral rear wheels 3L and 3R are thereby steered in the left direction opposite to that of the front wheels 2L and 2R. On the other hand, when the steering handle 21 is rightward rotated, a predetermined amount of the pressurized oil from the L-port of the Orbitrol 52 is introduced to the operation chambers 24b of the steering cylinders 24 for the rear wheels via the steering valve 62 for the rear wheels as hydraulic oil. The bilateral rear wheels 3L and 3R are thereby steered in the right direction. Simultaneously, the pressurized oil discharged from the operation chambers 24a of the steering cylinders 24 for the rear wheels is introduced to operation chambers 23b of the steering cylinders 23 for the front wheels as hydraulic oil after sequentially passing through the steering valve 62 for the rear wheels and the steering valve 61 for the front wheels. The bilateral front wheels 2L and 2R are thereby steered in the left direction opposite to that of the rear wheels 3L and 3R.

(8) During the rear mode of the reverse steering, only the electromagnetic part B of the steering valve 61 for the front wheels is output, so that the directional control valve 54 is positioned at position y; the steering valve 61 for the front wheels at position z; and the steering valve 62 for the rear wheels at position y. Hence, the pressurized oil from the hydraulic pump 50 is supplied to the directional control valve 44 of the power steering device 33 via the supply line 55 without being introduced to the Orbitrol 52 in the same manner as in the normal mode. At this time, if the steering handle 21 is leftward rotated so that the directional control valve 44 is switched to position x, the pressurized oil from the hydraulic pump 50 is introduced to the operation chambers 23a of the steering cylinders 23 for the front wheels via the steering valve 61 for the front wheels as hydraulic oil. The bilateral front wheels 2L and 2R are thereby steered in the right direction by receiving assist forces from the steering cylinders 23 for the front wheels. Also, if the steering handle 21 is rightward rotated so that the directional control valve 44 is switched to position y, the pressurized oil from the hydraulic pump 50 is introduced to the operation chambers 23b of the steering cylinders 23 for the front wheels as hydraulic oil after sequentially passing through the steering valve 62 for the rear wheels and the steering valve 61 for the front wheels. The bilateral front wheels 2L and 2R are thereby steered together in the left direction by receiving assist forces from the steering cylinders 23 for the front wheels.

Figure 6:
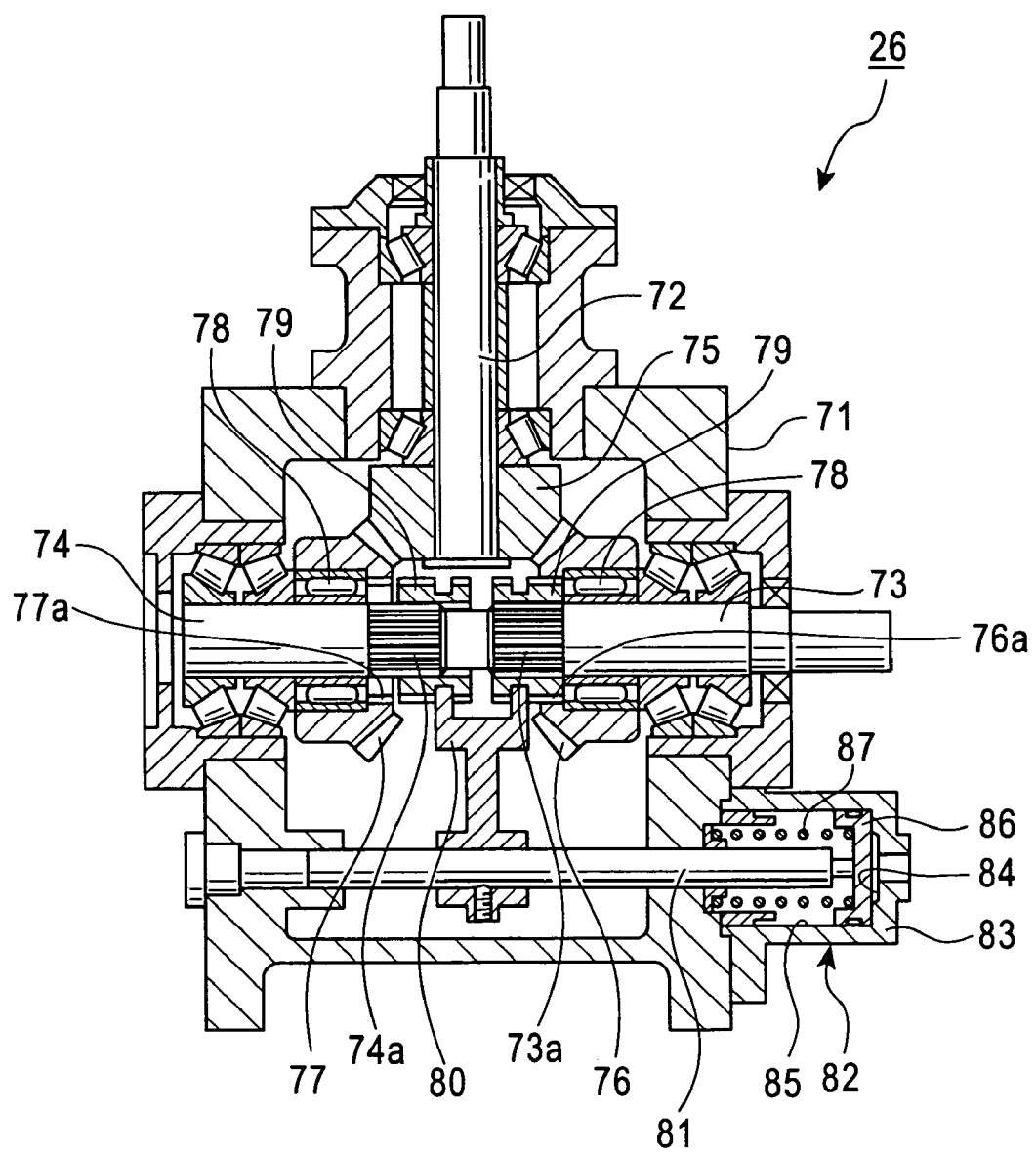
FIG. 6 is a sectional view of a gear box constituting switching means of the steering apparatus.

On the other hand, the switching means 26 is composed of a gear box 71 provided at the base end of a steering shaft 70 connected to the steering handle 21 constituting a rotating-body side transmission shaft train 31 of the mechanical steering means 22. The gear box 71, as shown in FIG. 6 in detail, includes an input shaft 72, through which a steering force is transmitted from the steering shaft 70, and first and second output shafts 73 and 74 arranged in an inverted T-shape including the input shaft 72, in which one end of the first output shaft 73 comes close to one end of the second output shaft 74 on the extended line of the input shaft 72 with the extended line of the input shaft 72 therebetween. The other end of the first output shaft 73 extends outside the gear box 71 so as to be connected to another constituting member of the rotating-body side transmission shaft train 31 of the mechanical steering means 22 for outputting a steering force to the constituting member. Although not shown, the second output shaft 74 is connected to a control valve 53 of the Orbitrol 52 of the full-hydraulic steering means 25 via a connection member for outputting a steering force:(the rotational direction and the rotational angle in detail) to the control valve 53.

A driving-side bevel gear 75 is integrally attached to the input shaft 72 while follower bevel gears 76 and 77 to be mated with the driving-side bevel gear 75 are inserted into the first and second output shafts 73 and 74 rotatably with bearings 78 therebetween, respectively. Inside end portions of both the first and second output shafts 73 and 74 are provided spline portions 73a and 74a formed thereon, on which dog clutches 79 and 79 are slidably mounted. The two dog clutches 79 and 79 are integrally slid by one folk 80 along the spline portions 73a and 74a in the same direction. Furthermore, when the dog clutches 79 and 79 slide to the right in the drawing, one dog clutch 79 is mated with internal teeth 76a formed on the follower bevel gear 76 of the first output shaft 73 so as to transmit a steering force to the first output shaft 73 from the input shaft 72 via the bevel gears 75 and 76. When the dog clutches 79 and 79 slide to the left in the drawing, the other dog clutch 79 is mated with internal teeth 77a formed on the follower bevel gear 77 of the second output shaft 74 so as to transmit a steering force to the second output shaft 74 from the input shaft 72 via the bevel gears 75 and 77.

The folk 80 is fixed to a support shaft 81, which is arranged in parallel with the output shafts 73 and 74 slidably in the axial direction within the gear box 71. At one end of the support shaft 81, an actuator 82 is provided for controlling to switch the dog clutches 79 and 79 using the folk 80 by sliding the support shaft 81 in the axial direction. The actuator 82 includes a cylinder 83, a piston 86 slidably arranged within the cylinder 83 so as to divide the cylinder 83 into an air chamber 84 and a spring chamber 85 and to connect the support shaft 81 extended through the spring chamber 85 of the actuator 82, and a coil spring 87 arranged on the external periphery of the support shaft 81 at one end within the spring chamber 85 in a compressed state. Although not shown, into the air chamber 84 of the cylinder 83, air at a predetermined pressure is supplied from a pressure source such as a compressor by the switching of an operation switch arranged in the cab 6. When air is not supplied to the air chamber 84 from the pressure source, as shown in the drawing, the piston 86 abuts the wall of the air chamber 84 by a springing force of the coil spring 87 so that the folk 80 slides to the right in the drawing so as to transmit a steering force to the first output shaft 73 from the input shaft 72, i.e., to be switched by the one dog clutch 79 to actuate the mechanical steering means 22.

On the other hand, when air is supplied to the air chamber 84 from the pressure source, the piston 86 slides toward the spring chamber 85 against the springing force of the coil spring 87 so that the folk 80 is moved to the left in the drawing so as to transmit a steering force to the second output shaft 74 from the input shaft 72, i.e., to be switched by the other dog clutch 79 to actuate the full-hydraulic steering means 25.

Next, the operation and effect of the steering apparatus 20 will be described. When traveling on a general public road, the apparatus is switched by the switching means 26 to actuate the mechanical steering means 22 (the normal mode) in advance. In this state, when the steering handle 21 is rotated, a rotational operating force, i.e., a steering force, is transmitted to the front-wheel tie rod 16 via the mechanical steering means 22 so as to steer the front bilateral wheels 2L and 2R. At this time, the front wheels 2L and 2R are connected to the steering handle 21 via the mechanical steering means 22. Hence, the steering of the front wheels 2L and 2R can be reinforced so as to sufficiently apply also to high-speed traveling. In particular, since the speed is limited in Europe due to the durability of the steering apparatus, the present invention is effective when it is brought into operation in Europe.

Moreover, the mechanical steering means 22 includes the power steering device 33 so that when the front wheels 2L and 2R are steered by transmitting a steering force of the steering handle 21 to the front-wheel tie rod 16, the steering of the front wheels 2L and 2R is assisted by introducing hydraulic oil to the steering cylinders 23 for the front wheels of the full-hydraulic steering means 25 by the directional control valve 44 of the power steering device 33. Hence, the front wheels 2L and 2R can be airily steered so as to improve the operationality. Moreover, the power steering device 33 also serves as the steering cylinders 23 for the front wheels of the full-hydraulic steering means 25 so as to reduce the number of components and the cost.

On the other hand, when traveling at low speed on a shop floor, the apparatus is switched by the switching means 26 so as to actuate the full-hydraulic steering means 25 in advance. In this state, when the steering handle 21 is rotated, hydraulic oil is introduced to the steering cylinders 23 for the front wheels or the steering cylinders 24 for the rear wheels in accordance with the rotational operation and the selected mode by the Orbitrol 52 and the steering valves 61 and 62 of the full-hydraulic steering means 25 so as to steer at least one of the front wheels 2L and 2R and the rear wheels 3L and 3R. The selected mode at this time may include the crab mode for steering the front and rear wheels in the same direction, the clamp mode for steering the front and rear wheels in opposite directions to each other, the rear mode for driving only the rear wheels 3L and 3R, and the-reverse steering mode (the normal mode and the clamp mode of the reverse steering, in detail) in addition to the normal mode, so that the same steering as that of the full-hydraulic steering apparatus described in "THE RELATED ART" can be secured. Moreover, even when any mode is selected, since it is sufficient to rotate only the steering handle 21, the operation is facilitated.

Also, during the crane operation on a shop floor, in the same way as during the low speed traveling, when the apparatus is switched by the switching means 26 so as to actuate the full-hydraulic steering means 25 in advance, by the mechanical steering means 22, the steering force transmission is blocked between the steering handle 21 adjacent to the upper rotating body 5 and the front-wheel tie rod 16 adjacent to the lower traveling body 1. Hence, even when the upper rotating body 5 is rotated along with the crane operation, the steering handle 21 cannot be rotated so as to not give uncomfortable feeling to an operator, improving the reliability.

Furthermore, according to the embodiment, the switching means 26 is mainly composed of the gear box 71 arranged at the base end of the steering shaft 70 and connected to the steering handle 21. The gear box 71 includes the input shaft 72 through which a steering force is transmitted from the steering shaft 70, the first output shaft 73 for outputting a steering force to the mechanical steering means 22, and the second output shaft 74 for outputting a steering force to the control valve 53 of the Orbitrol 52 of the full-hydraulic steering means 25, and the dog clutch 79 for transmitting a steering force from the input shaft 72 to any one of the first and second output shafts 73 and 74. Hence, by the switching of the dog clutch 79 of the gear box 71, a steering force from the steering handle 21 is securely transmitted to any one of the mechanical steering means 22 and the full-hydraulic steering means 25 so as to actuate its function, improving the reliability of the switching operation. Moreover, the input shaft 72 and the first and second output shafts 73 and 74 are arranged to come close to each other in an inverted T-shape while transmitting a steering force via the bevel gears 75 to 77, so that the gear box 71 can be miniaturized.

Figure 7:
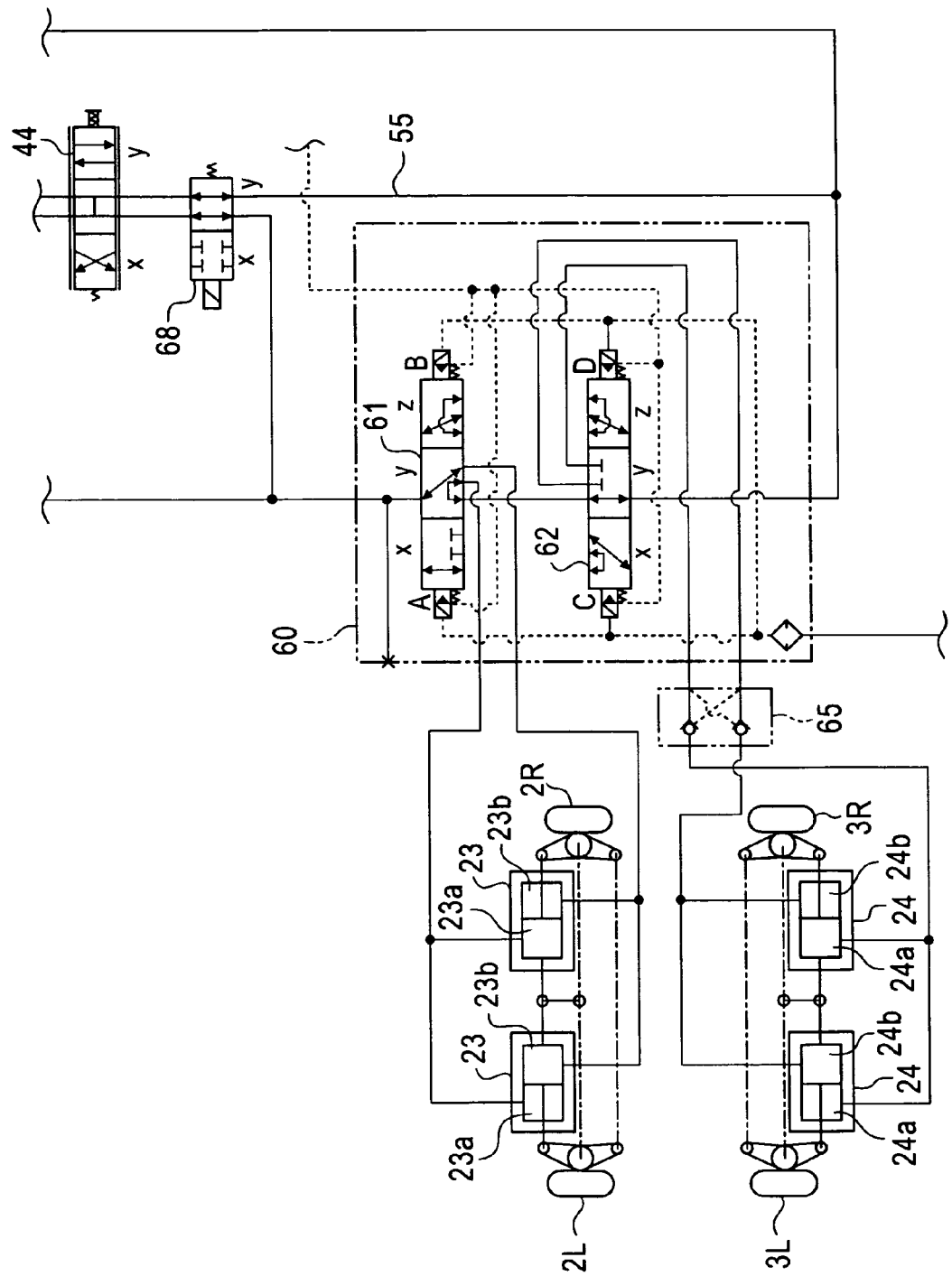
FIG. 7 is a drawing equivalent to FIG. 5, showing a steering apparatus of a wheeled crane according to a second embodiment of the present invention.

FIG. 7 shows a modification of the hydraulic circuit of the steering apparatus as a second embodiment of the present invention. According to the second embodiment, instead of the double pilot check valve 63 according to the first embodiment, an electromagnetic directional control valve 68 is provided on the downstream side of the directional control valve 44 along the supply line 55. The directional control valve 68 is constructed so as to switch the position in operatively associated with the selective switching by the switching means 26 (see FIG. 6). When the mechanical steering means is selected, the directional control valve 68 is positioned at position y as shown in the drawing so as to communicate the supply line 55, when the full-hydraulic steering means is selected, it is switched to position x so as to block the supply line 55. The other configuration is the same as that of the first embodiment, so that like reference symbols designate like components and the description thereof is omitted, and symbols of the first embodiment will be used for such components in the description below.

According to the first embodiment, when the mechanical steering means 22 is selected and the front wheels 2L and 2R are steered by the steering handle 21, even if a straight returning force is applied to the front wheels 2L and 2R, the steering cylinders 23 and 23 for the front wheels retain the returning force by the blocking function of the double pilot check valve 63. Thus, the straight returning force is not transmitted to the steering handle 21, and unless a driver applies a force to the steering handle 21, the front wheels do not return to the neutral position, so that the steering force is increased by that amount when returning the wheels to the neutral position. Whereas, according to the second embodiment, since the directional control valve 68 provided instead of the double pilot check valve 63 is positioned at position y communicating with the supply line 55 when the mechanical steering means 22 is selected, the returning force is transmitted to the steering handle 21 without being retained by the steering cylinder's 23 and 23 for the front wheels when the straight returning force is applied to the front wheels 2L and 2R during the steering the front wheels 2L and 2R. Accordingly, the steering force during returning the steering handle 21 to the neutral position can be reduced, improving steering performance.

Figure 8:
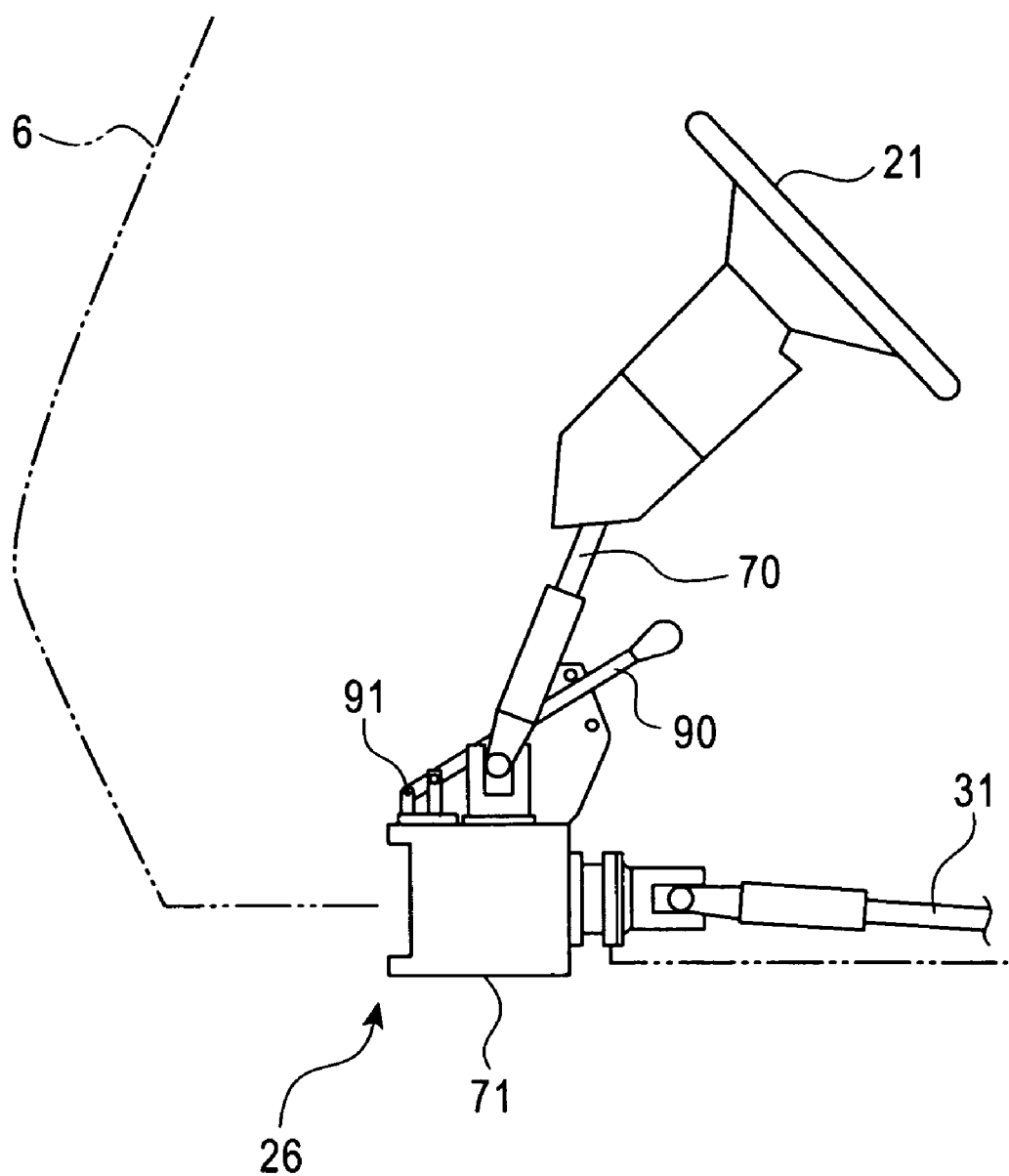
FIG. 8 is a side view of another embodiment of the switching means.
Figure 9:
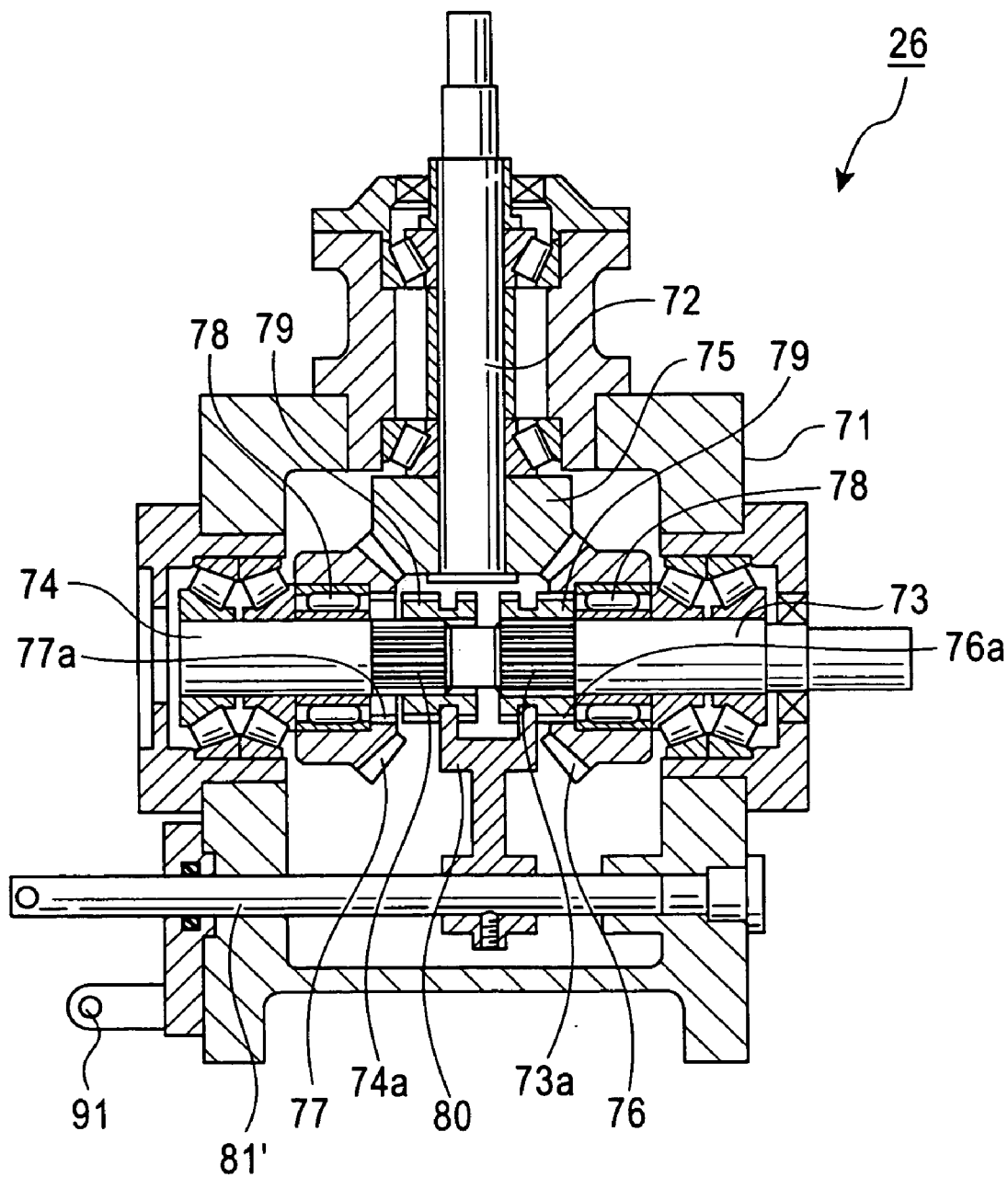
FIG. 9 is a drawing equivalent to FIG. 6, showing the switching means shown in FIG. 8.

The present invention is not limited to the first and second embodiments described above, so that various modifications may be made. For example, according to the embodiments, the pneumatic actuator 82 is used for switching the dog clutch 79 of the gear box 71 constituting the switching means 26; alternatively, according to the present invention, as shown in FIGS. 8 and 9, the gear box 71 may be provided with a select lever 90 attached swingably about a fulcrum 91 so as to slide the support shaft 81 in the gear box 71 in the axial direction by the swinging of the select lever 90 for switching the dog clutches 79 and 79 by the folk 80 without using such an actuator.

According to the first embodiment, the switching of the dog clutch 79 and, by the extension, the switching between the mechanical steering means 22 and the full-hydraulic steering means 25 are performed by an operator with switch operation; alternatively, according to the present invention, the switching may be automatically controlled by detecting the traveling speed with a sensor so as to actuate the mechanical steering means 22 during high-speed traveling and to actuate the full-hydraulic steering means 25 during low-speed traveling. However, in order to securely recognize the selected means, it is preferable to provide a display for showing a driver which steering means is actuated.

Furthermore, according to the first embodiment described above, in order miniaturize the gear box 71 constituting the switching means 26, the input shaft 72 through which a steering force is transmitted from the steering shaft 70, the first output shaft 73 for outputting a steering force to the mechanical steering means 22, and the second output shaft 74 for outputting a steering force to the full-hydraulic steering means 25 are arranged in an inverted T-shape by moving one end closer to one end of another component so as to transmit the steering force via the three bevel gears 75 to 77; alternatively, according to the present invention, the input shaft and the two output shafts may be arranged in parallel with each other so as to transmit the steering force via spur gears.

Moreover, according to the first and second embodiments, the mechanical steering means 22 shares the hydraulic pump 50 of the frill-hydraulic steering means 25 as a hydraulic source of the :power steering device 33; alternatively, according to the present invention, separate hydraulic pumps may be used.

In addition, in the wheeled working machine according to the embodiments, the wheeled crane having the bilateral front wheels 2L and 2R and the bilateral rear wheels 3L and 3R mounted on the lower traveling body 1 is exemplified; the steering apparatus according to the present invention is not limited to this, so that a wheeled crane may incorporate the invention, in which the respective bilateral rear wheels 3L and 3R may coaxially have two or more wheels, or each of two or three shafts arranged back and forth in parallel may have one wheel or a plurality of wheels, for example. The invention is also obvious to be applied to not only the wheeled crane but also other wheeled working machines such as a wheeled hydraulic excavator.

Although the invention has been described with reference to the preferred embodiments in the attached figures, it is noted that equivalents may be employed and substitutions made herein without departing from the scope of the invention as recited in the claims.

What is claimed is:

1. A wheeled working machine comprising:
   a lower traveling body having front wheels and rear wheels;
   an upper rotating body rotatably mounted on the lower traveling body;
   a cab arranged on one of the left and right sides of the upper rotating body for serving as an operating room during working as well as a driving room during traveling; and
   a steering apparatus, the steering apparatus comprising:

mechanical steering means for steering the front wheels in accordance with the operation of a steering handle arranged within the cab by connecting the steering handle to a link member for changing the direction of the front wheels so as to transmit a steering force;

full-hydraulic steering means, having steering cylinders for respectively changing the directions of the front wheels and the rear wheels, for steering at least one of the front wheels and the rear wheels by introducing hydraulic oil to predetermined steering cylinders in accordance with the operation of the steering handle and a selected mode relating to the steering of the front wheels and the rear wheels; and switching means for switching one of the mechanical steering means and the full-hydraulic steering means so as to be selectively actuated, wherein the mechanical steering means is constructed to assist the steering of the front wheels by introducing hydraulic oil to the steering cylinders for the front wheels of the full-hydraulic steering means in accordance with the rotational operation of the steering handle, and wherein the mechanical steering means includes a supply line for introducing hydraulic oil to the steering cylinders for the front wheels from a hydraulic source, a control valve arranged on the supply line for changing a communication state of the supply line in accordance with the rotational operation of the steering handle, and a double pilot check valve provided on the downstream side of the control valve for preventing pressurized oil from being returned to a tank circuit of the mechanical steering means when the full-hydraulic steering means is selected.

2. The machine according to claim 1, wherein the link member is a tie rod.

3. The machine according to claim 1, wherein the selected mode includes a normal mode for steering only the front wheels, a crab mode for steering the front and rear wheels in the same direction, a clamp mode for steering the front and rear wheels in opposite directions to each other for reducing a turning radius of the machine, and a reverse steering mode for driving with the same feeling as that in normal mode when traveling in a state that the upper rotating body is rotated at 180° to the lower traveling body.

4. The machine according to claim 1, wherein the switching means is composed of a gear box arranged at the base end of a steering shaft, the gear box including an input shaft through which a steering force is transmitted from the steering shaft, a first output shaft for outputting a steering force to the mechanical steering means, a second output shaft for outputting a steering force to the full-hydraulic steering means, and a clutch for transmitting a steering force to any one of the first and second output shafts from the input shaft.

5. The machine according to claim 1, wherein the mechanical steering means shares a hydraulic pump of the full-hydraulic steering means as a hydraulic source and includes a directional control valve for selectively communicating the pressurized oil of the hydraulic pump with a hydraulic circuit of the full-hydraulic steering means or the supply line.

* * * * *